US012042986B2

(12) United States Patent
Chaffins et al.

(10) Patent No.: US 12,042,986 B2
(45) Date of Patent: Jul. 23, 2024

(54) 3-DIMENSIONAL PRINTED PARTS

(71) Applicant: Hewlett-Packard Development Company, L.P., Spring, TX (US)

(72) Inventors: Sterling Chaffins, Corvallis, OR (US); Cassady Sparks Roop, Corvallis, OR (US); Kevin P. Dekam, Corvallis, OR (US); Vladek Kasperchik, Corvallis, OR (US); Ali Emamjomeh, San Diego, CA (US); Johnathon Holroyd, Corvallis, OR (US); Stephen G. Rudisill, San Diego, CA (US); Alexey S. Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 61 days.

(21) Appl. No.: 17/891,453

(22) Filed: Aug. 19, 2022

(65) Prior Publication Data
US 2022/0388239 A1    Dec. 8, 2022

Related U.S. Application Data

(62) Division of application No. 16/325,243, filed as application No. PCT/US2016/058595 on Oct. 25, 2016, now Pat. No. 11,458,675.

(51) Int. Cl.
*B29C 64/00* (2017.01)
*B29C 64/10* (2017.01)
(Continued)

(52) U.S. Cl.
CPC ............ *B29C 64/153* (2017.08); *B29C 64/00* (2017.08); *B29C 64/10* (2017.08); *B29C 64/176* (2017.08);
(Continued)

(58) Field of Classification Search
CPC ............................ B29C 64/153; B29C 64/336
See application file for complete search history.

(56) References Cited

U.S. PATENT DOCUMENTS

| 4,745,006 A | 5/1988 | Mohajer |
| 5,204,055 A | 4/1993 | Sachs et al. |
(Continued)

FOREIGN PATENT DOCUMENTS

| CN | 1500608 A | 6/2004 |
| CN | 1950192 A | 4/2007 |
(Continued)

OTHER PUBLICATIONS

Faraday, M., "X. The Bakerian Lecture—Experimental relations of gold (and other metals) to light" Philosophical Transactions of the Royal Society of London, vol. 147, Jan. 1, 1857, pp. 38.
(Continued)

*Primary Examiner* — Nicholas R Krasnow
(74) *Attorney, Agent, or Firm* — HP Inc. Patent Department

(57) ABSTRACT

The present disclosure is drawn to 3-dimensional printed parts that can include a conductive composite portion and an insulating portion. The conductive composite portion can include a matrix of fused thermoplastic polymer particles interlocked with a matrix of sintered elemental transition metal particles. The insulating portion can include a matrix of fused thermoplastic polymer particles that are continuous with the matrix of fused thermoplastic polymer particles in the conductive composite portion. The insulating portion can be substantially free of sintered elemental transition metal particles and can include transition metal oxide bronze particles.

9 Claims, 3 Drawing Sheets

(51) Int. Cl.
| | | |
|---|---|---|
| B29C 64/153 | (2017.01) |
| B29C 64/176 | (2017.01) |
| B29C 64/182 | (2017.01) |
| B29C 64/20 | (2017.01) |
| B29C 64/205 | (2017.01) |
| B29C 64/227 | (2017.01) |
| B29C 64/245 | (2017.01) |
| B29C 64/25 | (2017.01) |
| B29C 64/255 | (2017.01) |
| B29C 64/30 | (2017.01) |
| B29C 64/307 | (2017.01) |
| B29C 64/336 | (2017.01) |
| B29C 64/40 | (2017.01) |
| B29C 70/88 | (2006.01) |
| B33Y 30/00 | (2015.01) |
| B33Y 40/00 | (2020.01) |
| B33Y 40/10 | (2020.01) |
| B33Y 40/20 | (2020.01) |
| B33Y 50/00 | (2015.01) |
| B33Y 70/10 | (2020.01) |
| B33Y 80/00 | (2015.01) |
| B33Y 99/00 | (2015.01) |
| C08K 3/08 | (2006.01) |
| C08K 3/22 | (2006.01) |
| C08L 67/04 | (2006.01) |
| C09D 11/322 | (2014.01) |
| C09D 11/40 | (2014.01) |
| C09D 11/52 | (2014.01) |
| B29K 505/08 | (2006.01) |
| B33Y 10/00 | (2015.01) |
| B33Y 70/00 | (2020.01) |
| C08L 77/02 | (2006.01) |

(52) U.S. Cl.
CPC ............ *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/336* (2017.08); *B29C 64/40* (2017.08); *B29C 70/882* (2013.01); *B33Y 30/00* (2014.12); *B33Y 40/00* (2014.12); *B33Y 40/10* (2020.01); *B33Y 40/20* (2020.01); *B33Y 50/00* (2014.12); *B33Y 70/10* (2020.01); *B33Y 80/00* (2014.12); *B33Y 99/00* (2014.12); *C08K 3/08* (2013.01); *C08K 3/22* (2013.01); *C08L 67/04* (2013.01); *C09D 11/322* (2013.01); *C09D 11/40* (2013.01); *C09D 11/52* (2013.01); *B29K 2505/08* (2013.01); *B33Y 10/00* (2014.12); *B33Y 70/00* (2014.12); *C08K 2003/0806* (2013.01); *C08K 2003/0831* (2013.01); *C08K 2003/085* (2013.01); *C08K 2003/2258* (2013.01); *C08K 2201/005* (2013.01); *C08K 2201/011* (2013.01); *C08L 77/02* (2013.01)

(56) References Cited

U.S. PATENT DOCUMENTS

| | | |
|---|---|---|
| 6,036,777 A | 3/2000 | Sachs |
| 7,972,426 B2 | 7/2011 | Hinch et al. |
| 8,651,390 B2 | 2/2014 | Hinch et al. |
| 9,343,231 B2 | 5/2016 | Chai et al. |
| 9,643,359 B2 | 5/2017 | Baumann et al. |
| 2006/0225834 A1 | 10/2006 | Medina et al. |
| 2006/0244169 A1 | 11/2006 | Monsheimer et al. |
| 2007/0183918 A1 | 8/2007 | Monsheimer et al. |
| 2007/0238056 A1 | 10/2007 | Baumann et al. |
| 2007/0241482 A1 | 10/2007 | Giller et al. |
| 2014/0035995 A1 | 2/2014 | Chou et al. |
| 2014/0238833 A1 | 8/2014 | Virkar et al. |
| 2015/0024319 A1 | 1/2015 | Martin |
| 2015/0366073 A1 | 12/2015 | Magdassi et al. |
| 2016/0007474 A1 | 1/2016 | Dardona et al. |
| 2016/0231480 A1 | 8/2016 | Boman et al. |
| 2016/0242296 A1 | 8/2016 | Deangelis |
| 2016/0276056 A1 | 9/2016 | Stolyarov et al. |
| 2016/0340542 A1 | 11/2016 | Kim et al. |
| 2017/0253681 A1 | 9/2017 | Shen et al. |
| 2018/0244862 A1 | 8/2018 | Price |

FOREIGN PATENT DOCUMENTS

| | | |
|---|---|---|
| CN | 104226997 A | 12/2014 |
| CN | 104552947 A | 4/2015 |
| EP | 2943526 A2 | 11/2015 |
| JP | 08-057967 A | 3/1996 |
| WO | 2007/114895 A2 | 10/2007 |
| WO | 2014/108876 A2 | 7/2014 |

OTHER PUBLICATIONS

Garcia, G., et al. "Dynamically modulating the surface plasmon resonance of doped semiconductor nanocrystals." Nano letters, vol. 11, Aug. 22, 2011, pp. 4415-4420.

Greenblatt, M., "Molybdenum and Tungsten Bronzes", In Physics and chemistry of low-dimensional inorganic conductors NSSB, vol. 354, 1996, pp. 15-43.

Gross B. C. et al. "Evaluation of 3D printing and its potential impact on biotechnology and the chemical sciences," Anal Chem, Jan. 16, 2014, pp. 3240-3253.

Kanehara, M., et al., "Indium tin oxide nanoparticles with compositionally tunable surface plasmon resonance frequencies in the near-IR region" J Am Chem Soc, vol. 131, No. 49, 2009, pp. 17736-17737.

Milligan, W.O., et al., "Morphology of Colloidal Gold-A Comparative Study." Journal of the American Chemical Society, vol. 86, Sep. 5, 1964, pp. 3461-3467.

Usui, H., et al., "Optical transmittance of indium tin oxide nanoparticles prepared by laser-Induced fragmentation in water", The Journal of Physical Chemistry B, vol. 110, May 10, 2006, pp. 12890-12895.

Van der Zande, Bianca Mi, et al., "Aqueous gold sols of rod-shaped particles." The Journal of Physical Chemistry B, vol. 101, No. 6, 1997, pp. 852-854.

Weiser, H., et al., "Von Weimarn's Precipitation Theory and the Formation of Colloidal Gold", The Rice Institute, Houston, TX., Jul. 1, 1932, pp. 1951-1959.

3-DIMENSIONAL PRINTED PARTS

The present application is a divisional of U.S. patent application Ser. No. 16/325,243 filed on Feb. 13, 2019, which is a National Stage application of International Application No. PCT/US2016/058595 filed on Oct. 25, 2016, each of which is incorporated herein by reference.

BACKGROUND

Methods of 3-dimensional (3D) digital printing, a type of additive manufacturing, have continued to be developed over the last few decades. Various methods for 3D printing have been developed, including heat-assisted extrusion, selective laser sintering, photolithography, as well as others. In selective laser sintering, for example, a powder bed is exposed to point heat from a laser to melt the powder wherever the object is to be formed. This allows for manufacturing complex parts that are difficult to manufacture using traditional methods. However, systems for 3D printing have historically been very expensive, though those expenses have been coming down to more affordable levels recently. In general, 3D printing technology improves the product development cycle by allowing rapid creation of prototype models for reviewing and testing. Unfortunately, the concept has been somewhat limited with respect to commercial production capabilities because the range of materials used in 3D printing is likewise limited. Therefore, research continues in the field of new techniques and materials for 3D printing.

Figure 1:
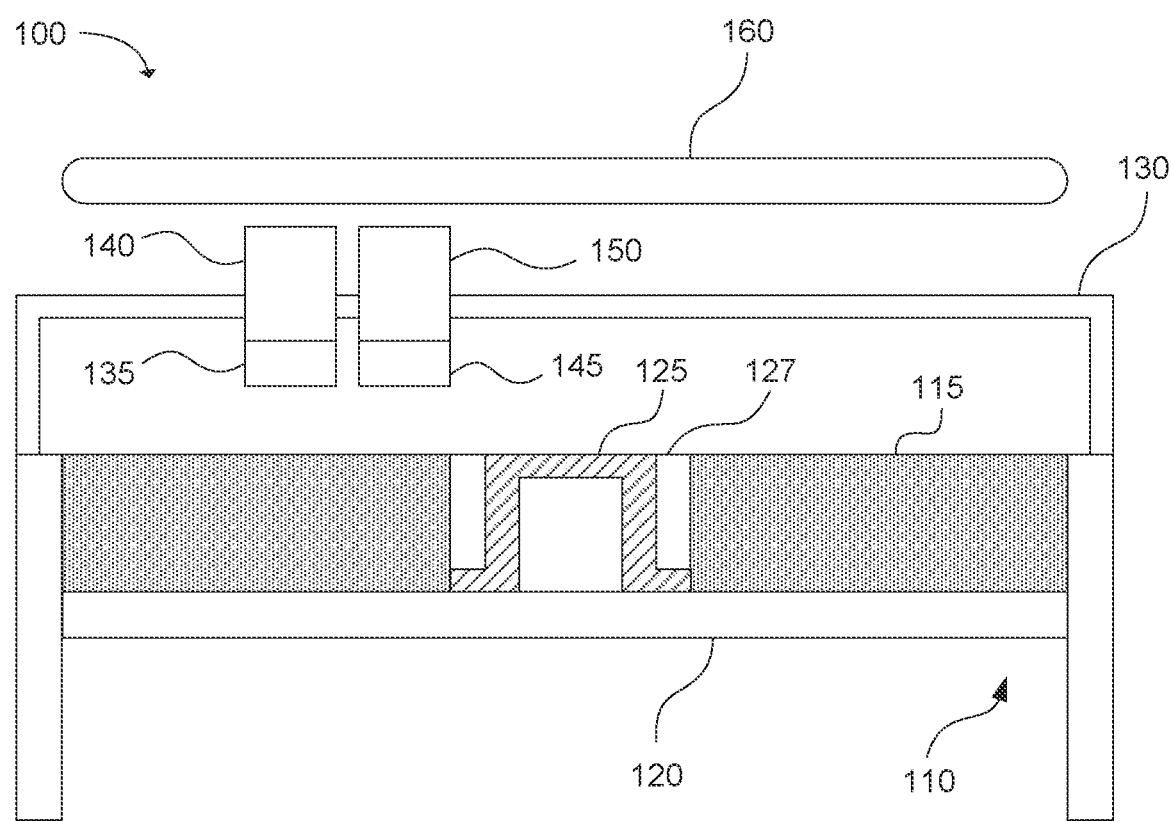
FIG. 1 is a schematic view of a 3-dimensional printing system in accordance with examples of the present disclosure.

The figures depict several examples of the presently disclosed technology. However, it should be understood that the present technology is not limited to the examples depicted.

DETAILED DESCRIPTION

The present disclosure is drawn to the area of 3-dimensional printing. More specifically, the present disclosure provides material sets and systems for printing 3-dimensional parts with electrically conductive features. In an exemplary printing process, a thin layer of polymer powder is spread on a bed to form a powder bed. A printing head, such as an fluid jet print head, is then used to print a fusing agent composition over portions of the powder bed corresponding to a thin layer of the three dimensional object to be formed. Then the bed is exposed to a light source, e.g., typically the entire bed. The fusing agent composition absorbs more energy from the light than the unprinted powder. The absorbed light energy is converted to thermal energy, causing the printed portions of the powder to melt and coalesce. This forms a solid layer. After the first layer is formed, a new thin layer of polymer powder is spread over the powder bed and the process is repeated to form additional layers until a complete 3-dimensional part is printed. Such 3-dimensional printing processes can achieve fast throughput with good accuracy.

In some examples of the presently disclosed technology, an electrically conductive fusing agent composition can be used together with a nonconductive fusing agent composition to form 3-dimensional printed parts with electrically conductive features. The conductive fusing agent composition can be jetted on portions of the powder bed that are desired to be conductive, and the nonconductive fusing agent composition can be jetting on other portions of the powder bed to form the other portions of the final printed part. The materials, systems, and methods described herein can be used to print parts having a wide variety of electrical configurations, such as embedded electrical elements and surface electrical elements. The present technology can also make it possible to form electrical elements enabled by 3-dimensional printing that are not possible using standard electronics manufacturing techniques, such as embedded coils, diagonal vias, and so on.

Although a variety of fusing agent compositions may be effective to absorb energy to heat and fuse the polymer powder, only certain fusing agent compositions can be effectively used as conductive fusing agent compositions or nonconductive fusing agent compositions as described herein. For example, conductive fusing agent compositions can include conductive materials that, when applied to the polymer powder and then fused, form a conductive composite material with the fused polymer. In contrast, the nonconductive fusing agent compositions can form areas in the 3-dimensional printed part that have very low electrical conductivity. In other words, the nonconductive fusing agent compositions can form electrically insulating portions in the 3-dimensional printed part. These insulating portions can prevent current leakage and cross talk between conductive portions of the 3-dimensional printed part. Many electronic applications can benefit from having multiple conductive elements that are isolated from one another by electrically insulating areas.

Carbon black can be used as an energy absorber in fusing agent compositions, because carbon black can absorb a wide range of wavelengths of electromagnetic radiation. However, in many cases when carbon black is used in fusing agent compositions at high enough concentrations to be an effective energy absorber, the resulting fused material will have a significant electrical conductivity. This is likely due to the fact that carbon black is electrically conductive and has a low inter-particle resistance between particles of the carbon black in the fused material. Therefore, in some examples of the present technology, particulate energy absorbers with high inter-particle resistance can be used in the nonconductive fusing agent compositions. In particular, transition metal oxide bronzes in particulate form can have high inter-particle resistances. When such transition metal oxide bronzes are used in fusing agent compositions to form a 3-dimensional printed part, the resulting part can be insulating.

As used herein, "insulating" and "nonconductive" can refer to materials that have no measurable electrical conductivity or that have extremely low electrical conductivity compared to the conductivity of 3-dimensional printed parts formed using the conductive fusing agent compositions described herein. In some examples, an insulating portion of a 3-dimensional printed part can have a resistivity of 1,000,000 Ω·m or more.

In one example of the present technology, a material set can include a thermoplastic polymer powder having an average particle size from 20 µm to 200 µm; a conductive fusing agent composition including a transition metal; and a nonconductive fusing agent composition including transition metal oxide bronze particles. In certain examples, the transition metal can be in the form of elemental transition metal particles. The elemental transition metal particles can include silver particles, copper particles, gold particles, or combinations thereof. In some cases, the elemental transition metal particles can have an average particle size from 10 nm to 200 nm. In further examples, the transition metal oxide bronze particles can include a tungsten bronze, a molybdenum bronze, or combinations thereof. In a particular example, the transition metal oxide bronze particles can include a cesium tungsten bronze with composition $Cs_xWO_3$ (0<x<1) having an average particle size of 2 nm to 200 nm. In another example, the transition metal oxide bronze particles can be in an aqueous dispersion. In further examples, when the nonconductive fusing agent composition is printed between two portions of the thermoplastic polymer powder printed with the conductive fusing agent composition and the thermoplastic polymer powder is fused by applying electromagnetic radiation, the nonconductive fusing agent composition can substantially prevent crosstalk between conductive composite portions formed from the portions printed with the conductive fusing agent composition.

In another example of the present technology, a 3-dimensional printing system can include a powder bed including a thermoplastic polymer powder having an average particle size from 20 µm to 200 µm, a fluid jet printer, and a fusing lamp. The fluid jet printer can include a first fluid jet printing slot in communication with a reservoir of a conductive fusing agent composition to print the conductive fusing agent composition onto the powder bed, wherein the conductive fusing agent composition includes a transition metal, and a second fluid jet printing slot in communication with a reservoir of a nonconductive fusing agent composition to print the nonconductive fusing agent composition onto the powder bed, and wherein the nonconductive fusing agent composition includes transition metal oxide bronze particles. The fusing lamp can be to expose the powder bed to electromagnetic radiation sufficient to fuse thermoplastic polymer powder that has been printed with the conductive fusing agent composition or the nonconductive fusing agent composition. In further examples, the transition metal can be in the form of elemental transition metal particles. In some examples, the elemental transition metal particles can have an average particle size from 10 nm to 200 nm. In still further examples, the transition metal oxide bronze particles can include a tungsten bronze, a molybdenum bronze, or combinations thereof. In a particular example, the transition metal oxide bronze particles can include a cesium tungsten bronze with composition $Cs_xWO_3$ (0<x<1) having an average particle size of 2 nm to 200 nm.

In another example of the present technology, a 3-dimensional printed part can include a conductive composite portion including a matrix of fused thermoplastic polymer particles interlocked with a matrix of sintered elemental transition metal particles; and an insulating portion including a matrix of fused thermoplastic polymer particles that is continuous with the matrix of fused thermoplastic polymer particles in the conductive composite portion. The insulating portion can be substantially free of sintered elemental transition metal particles, and the insulating portion includes transition metal oxide bronze particles. In a specific example, the transition metal oxide bronze particles can include a cesium tungsten bronze with composition $Cs_xWO_3$ (0<x<1) having an average particle size of 2 nm to 200 nm.

In accordance with these examples, the material set, such as for 3-dimensional printing, can include a thermoplastic polymer powder, a conductive fusing agent composition, and a nonconductive fusing agent composition. The thermoplastic polymer powder can include powder particles with an average particle size from 20 µm to 200 µm. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles.

In certain examples, the polymer particles can have a variety of shapes, such as substantially spherical particles or irregularly-shaped particles. In some examples, the polymer powder can be capable of being formed into 3D printed parts with a resolution of 20 µm to 200 µm. As used herein, "resolution" refers to the size of the smallest feature that can be formed on a 3D printed part. The polymer powder can form layers from about 20 µm to about 200 µm thick, allowing the fused layers of the printed part to have roughly the same thickness. This can provide a resolution in the z-axis direction of about 20 µm to about 200 µm. The polymer powder can also have a sufficiently small particle size and sufficiently regular particle shape to provide about 20 µm to about 200 µm resolution along the x-axis and y-axis.

In some examples, the thermoplastic polymer powder can be colorless. For example, the polymer powder can have a white, translucent, or transparent appearance. When used with a colorless fusing agent composition, such polymer powders can provide a printed part that is white, translucent, or transparent. In other examples, the polymer powder can be colored for producing colored parts. In still other examples, when the polymer powder is white, translucent, or transparent, color can be imparted to the part by the fusing agent composition or another colored ink.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be selected from the group consisting of nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, and mixtures thereof. In a specific example, the polymer powder can be nylon 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from 10:1 to 1:2 or from 5:1 to 1:1.

The material set can also include a conductive fusing agent composition. The conductive fusing agent composition can include a transition metal. When the conductive fusing agent composition is printed onto a layer of the thermoplastic polymer powder, the conductive fusing agent composition can penetrate into the spaces between powder particles. The layer can then be cured by exposing the layer to electromagnetic radiation. The conductive fusing agent composition can facilitate fusing of the powder particles by absorbing energy from the electromagnetic radiation and converting the energy to heat. This raises the temperature of the powder above the melting or softening point of the thermoplastic polymer. Additionally, during printing, curing, or both, the transition metal in the conductive fusing agent composition can form a conductive transition metal matrix that becomes interlocked with the fused thermoplastic polymer particles.

In some examples, the transition metal in the conductive fusing agent composition can be in the form of elemental transition metal particles. The elemental transition metal particles can include, for example, silver particles, copper particles, gold particles, platinum particles, palladium particles, chromium particles, nickel particles, zinc particles, or combinations thereof. The particles can also include alloys of more than one transition metal, such as Au—Ag, Ag—Cu, Ag—Ni, Au—Cu, Au—Ni, Au—Ag—Cu, or Au—Ag—Pd.

In certain examples, other non-transition metals can be included in addition to the transition metal. The non-transition metals can include lead, tin, bismuth, indium, gallium, and others. In some examples, soldering alloys can be included. The soldering alloys can include alloys of lead, tin, bismuth, indium, zinc, gallium, silver, copper, in various combinations. In certain examples, such soldering alloys can be printed in locations that are to be used as soldering connections for printed electrical components. The soldering alloys can be formulated to have low melting temperatures useful for soldering, such as less than 230° C.

In certain examples, the elemental transition metal particles can be nanoparticles having an average particle size from 10 nm to 200 nm. In more specific examples, the elemental transition metal particles can have an average particle size from 30 nm to 70 nm.

As metal particles are reduced in size, the temperature at which the particles are capable of being sintered can also be reduced. Therefore, using elemental transition metal nanoparticles in the conductive fusing agent composition can allow the particles to sinter and form a conductive matrix of sintered nanoparticles at relatively low temperatures. For example, the elemental transition metal particles in the conductive fusing agent composition can be capable of being sintered at or below the temperature reached during curing in the 3-dimensional printing process. In a further example, the thermoplastic polymer powder bed can be heated to a preheat temperature during the printing process, and the elemental transition metal particles can be capable of being sintered at or below the preheat temperature. In still further examples, the elemental transition metal particles can be capable of being sintered at a temperature from 20° C. to 350° C. As used herein, the temperature at which the elemental transition metal particles are capable of being sintered refers to the lowest temperature at which the particles will become sintered together, forming a conductive matrix of sintered particles. It is understood that temperatures above this lowest temperature will also cause the particles to become sintered.

In additional examples of the conductive fusing agent composition, the transition metal can be in the form of elemental transition metal particles that are stabilized by a dispersing agent at surfaces of the particles. The dispersing agent can include ligands that passivate the surface of the particles. Suitable ligands can include a moiety that binds to the transition metal. Examples of such moieties can include sulfonic acid, phosphonic acid, carboxylic acid, dithiocarboxylic acid, phosphonate, sulfonate, thiol, carboxylate, dithiocarboxylate, amine, and others. In some cases, the dispersing agent can contain an alkyl group having from 3-20 carbon atoms, with one of the above moieties at an end of the alkyl chain. In certain examples, the dispersing agent can be an alkylamine, alkylthiol, or combinations thereof. In further examples, the dispersing agent can be a polymeric dispersing agent, such as polyvinylpyrrolidone (PVP), polyvinylalcohol (PVA), polymethylvinylether, poly(acrylic acid) (PAA), nonionic surfactants, polymeric chelating agents, and others. The dispersing agent can bind to the surfaces of the elemental transition metal particles through chemical and/or physical attachment. Chemical bonding can include a covalent bond, hydrogen bond, coordination complex bond, ionic bond, or combinations thereof. Physical attachment can include attachment through van der Waal's forces, dipole-dipole interactions, or a combination thereof.

In further examples, the conductive fusing agent composition can include a transition metal in the form of a metal salt or metal oxide. Under certain conditions, a transition metal salt or metal oxide in the conductive fusing agent composition can form elemental transition metal particles in situ after being printed onto the thermoplastic polymer powder bed. The elemental transition metal particles thus formed can then be sintered together to form a conductive matrix. In some examples, a reducing agent can be reacted with the metal salt or metal oxide to produce elemental metal particles. In one example, a reducing agent can be underprinted onto the powder bed before the conductive fusing agent composition. In another example, a reducing agent can be overprinted over the conductive fusing agent composition. In either case, the reducing agent can be reacted with the metal salt or metal oxide to form elemental metal particles before the thermoplastic polymer particle layer is cured. Suitable reducing agents can include, for example, glucose, fructose, maltose, maltodextrin, trisodium citrate, ascorbic acid, sodium borohydride, ethylene glycol, 1,5-pentanediol, 1,2-propylene glycol, and others.

The concentration of transition metal in the conductive fusing agent composition can vary. However, higher transition metal concentrations can tend to provide better conductivity due to a larger amount of conductive material being deposited on the powder bed. In some examples, the conductive fusing agent composition can contain from about 5 wt % to about 50 wt % of the transition metal, with respect to the entire weight of the conductive fusing agent composition. In further examples, the conductive fusing agent composition can contain from about 10 wt % to about 30 wt % of the transition metal, with respect to the entire weight of the conductive fusing agent composition.

In some examples of the material sets according to the present technology, a pretreat agent composition can be used with the conductive fusing agent composition. The pretreat agent composition can include a metal halide salt, such as a salt of lithium, potassium, or sodium with chloride, bromide, or iodide, for example. The metal halide salt can react with dispersing agents at the surfaces of transition metal particles to remove the dispersing agents from the particles. This can increase the sintering between the metal particles and improve the conductivity of the matrix formed of the sintered particles. The pretreat agent composition can be dispensed onto the powder bed before the conductive fusing agent composition. When the conductive fusing agent composition is printed over the pretreat agent composition, the transition metal particles can come into contact with the metal halide salt in the pretreat agent composition. In alternate examples, the polymer powder can be pretreated with a metal halide salt before being used in the 3-dimensional printing system. When the conductive fusing agent composition is printed onto the powder bed, the transition metal particles in the conductive fusing agent composition can come into contact with the metal halide salt already present on the powder.

Material sets in accordance with the present technology can also include a nonconductive fusing agent composition. In some examples, the nonconductive fusing agent composition can be devoid or substantially devoid of the transition metal contained in the conductive fusing agent composition. The nonconductive fusing agent composition can contain transition metal oxide bronze particles. These particles can be capable of absorbing electromagnetic radiation to produce heat. In some examples, transition metal oxide bronze particles can act as broadband absorbers, absorbing a wide range of wavelengths of electromagnetic radiation. The transition metal oxide bronze particles can especially absorb a broad range of wavelengths in the near-infrared spectrum.

In some examples, the transition metal oxide bronze particles can have particle surfaces including an insulating oxide layer. This layer can provide high inter-particle contact resistance between the transition metal oxide bronze particles. In still other examples, the particles, when printed onto polymer powder and fused, can provide a fused material with a resistivity of 1,000,000 Ω·m or more.

In some cases, transition metal oxide bronzes can be electrically conductive as bulk materials. However, when in the form of fine particles these materials can be nonconductive. The particles can have high inter-particle resistance, especially when the particles are dispersed in an aqueous or other hydrolyzing dispersion. Without being limited to a particular mechanism, the particles may hydrolyze upon contact with water and form a layer of insulating oxide with dielectric properties.

In further examples, the transition metal oxide bronze particles can include a tungsten bronze or a molybdenum bronze. Tungsten bronzes and molybdenum bronzes can respectively have the composition $Me_xWO_3$ or $Me_xMoO_3$ where Me is Na, K, Rb, or Cs and $0<x<1$. These materials can have high inter-particle resistance, especially when the particles are dispersed in an aqueous dispersion Thus, even though the tungsten bronze or molybdenum bronze materials may be electrically conductive as a bulk material, fine particles of these materials can have high inter-particle resistance. In certain examples, the transition metal oxide bronze particles can include a cesium tungsten bronze with the composition $Cs_xWO_3$ where $0<x<1$.

In an additional example, the nonconductive fusing agent composition can include particulate lanthanum hexaboride ($LaB_6$). In further examples, the nonconductive fusing agent composition can also include other energy absorbers capable of absorbing electromagnetic radiation to produce heat while also providing an insulating 3-dimensional printed final part.

In some examples, the nonconductive fusing agent composition can include carbon black together with the transition metal oxide bronze particles described above. The respective concentrations of carbon black and the transition metal oxide bronze particles can be sufficient that when the nonconductive fusing agent composition is printed onto polymer powder and the polymer powder is fused, the resulting material is nonconductive.

The amount of the transition metal oxide bronze particles in the nonconductive fusing agent composition can vary depending on the type of transition metal oxide bronze particles. In some examples, the concentration of transition metal oxide bronze particles in the nonconductive fusing agent composition can be from 0.1 wt % to 20 wt %. In one example, the concentration of transition metal oxide bronze particles in the nonconductive fusing agent composition can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

As mentioned above, the transition metal oxide bronze particles can act as an energy absorber in the nonconductive fusing agent composition. Similarly, the transition metal can act as an energy absorber in the conductive fusing agent composition. Energy absorbers can have a temperature boosting capacity sufficient to increase the temperature of the polymer powder above the melting or softening point of the polymer powder. As used herein, "temperature boosting capacity" refers to the ability of an energy absorber to convert near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing agent composition is printed on a portion of the polymer powder, the energy absorber can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the energy absorber can have a temperature boosting capacity from about 10° C. to about 70° C. for a polymer with a melting or softening point from about 100° C. to about 350° C. If the powder bed is at a temperature within about 10° C. to about 70° C. of the melting or softening point, then such an energy absorber can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing agent composition can then be printed onto the powder and the powder bed can be irradiated with a near-infrared light to coalesce the printed portion of the powder.

In some examples of the material set according to the present technology, the conductive fusing agent composition and the nonconductive fusing agent composition can be balanced so that thermoplastic polymer powder that is printed with the conductive fusing agent composition and the nonconductive fusing agent composition reach nearly the same temperature when exposed to light during curing. The type and amount of energy absorber in the nonconductive fusing agent composition can be selected to match the temperature boosting capacity of the transition metal in the conductive fusing agent composition. The type and amount of transition metal in the conductive fusing agent composition can also be adjusted to match the temperature boosting capacity of the energy absorber in the nonconductive fusing agent composition. Additionally, in some examples the conductive fusing agent composition can contain another energy absorber other than the transition metal. In certain examples, the conductive fusing agent composition and the nonconductive fusing agent composition can raise the temperature of the thermoplastic polymer powder to temperatures within 30° C., within 20° C., or within 10° C. of each other during curing.

In further examples, the material set can also include colored inks for adding color to the thermoplastic polymer powder. This can allow for printing of full-color 3-dimensional parts. In one example, the material set can include cyan, magenta, yellow, and black inks in addition to the conductive fusing agent composition, nonconductive fusing agent composition, and pretreat agent composition if present.

Each of the conductive fusing agent composition, pretreat agent composition, nonconductive fusing agent composition, and additional colored inks can be formulated for use in a fluid jet printer such as an ink jet printer. The transition metal and transition metal oxide bronze particles can be stable in a jetting liquid vehicle and the fusing agent compositions can provide good jetting performance. In some examples, the transition metal and transition metal oxide bronze particles can be water-soluble, water-dispersible, organic-soluble, or organic-dispersible. The transition metal and transition metal oxide bronze particles can also be compatible with the thermoplastic polymer powder so that jetting the fusing agent compositions onto the polymer powder provides adequate coverage and penetration of the transition metal and transition metal oxide bronze particles into the powder.

Any of the above described fluids can also include a pigment or dye colorant that imparts a visible color to the fluids. In some examples, the colorant can be present in an amount from 0.5 wt % to 10 wt % in the inks. In one example, the colorant can be present in an amount from 1 wt % to 5 wt %. In another example, the colorant can be present in an amount from 5 wt % to 10 wt %. However, the colorant is optional and in some examples the fluids can include no additional colorant. These fluids can be used to print 3D parts that retain the natural color of the polymer powder. Additionally, the fluids can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch®1400, Monarch® 1300, Monarch®) 1100, Monarch®1000, Monarch®) 900, Monarch®880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex®140U, Printex®140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven®5750, Raven® 5250, Raven® 5000, and Raven® 3500. The following pigment is available from Sun Chemical: LHD9303 Black. Any other pigment and/or dye can be used that is useful in modifying the color of the above described fluids and/or ultimately, the printed part.

The colorant can be included in the conductive fusing agent composition and/or the nonconductive fusing agent composition to impart color to the printed object when the fusing agent compositions are jetted onto the powder bed. Optionally, a set of differently colored fusing agent compositions can be used to print multiple colors. For example, a set of fusing agent compositions including any combination of cyan, magenta, yellow (and/or any other colors), colorless, white, and/or black fusing agent compositions can be used to print objects in full color. Alternatively or additionally, a colorless fusing agent composition can be used in conjunction with a set of colored, non-fusing agent compositions to impart color. In some examples, a colorless fusing agent composition can be used to coalesce the polymer powder and a separate set of colored or black or white inks not containing an energy absorber can be used to impart color.

The components of the above described fluids can be selected to give the fluids good jetting performance and the ability to color the polymer powder with good optical density. Besides the transition metals, transition metal oxide bronze particles, colorants and other ingredients described above, the fluids can also include a liquid vehicle. In some examples, the liquid vehicle formulation can include water and one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water. In some examples, a water-dispersible energy absorber can be used with an aqueous vehicle. Because the energy absorber is dispersible in water, an organic co-solvent is not necessary to disperse the energy absorber. Therefore, in some examples the fusing agent compositions can be substantially free of organic solvent. However, in other examples a co-solvent can be used to help disperse other dyes or pigments, improve the jetting properties of the fusing agent compositions, or improve penetration of the fluid into the powder bed. In still further examples, a non-aqueous vehicle can be used with an organic-dispersible energy absorber.

In certain examples, a high boiling point co-solvent can be included in the fluids. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, various other additives can be employed to optimize the properties of the fluids for specific applications. Examples of these additives are those added to inhibit the growth of harmful microorganisms. These additives may be biocides, fungicides, and other microbial agents. Examples of suitable microbial agents include, but are not limited to, Nuosept® (Nudex, Inc.), Ucarcide™ (Union carbide Corp.), Vancide® (R.T. Vanderbilt Co.), Proxel® (ICI America), and combinations thereof.

Sequestering agents, such as EDTA (ethylene diamine tetra acetic acid), may be included to eliminate the deleterious effects of heavy metal impurities, and buffer solutions may be used to control the pH of the fluids. From 0.01 wt % to 2 wt %, for example, can be used. Viscosity modifiers and buffers may also be present, as well as other additives to modify properties of the fluids as desired. Such additives can be present at from 0.01 wt % to 20 wt %.

In addition to the material sets described above, the present technology also encompasses 3-dimensional printing systems that include the material sets. An example of a 3-dimensional printing system 100 is shown in FIG. 1. The system includes a powder bed 110 including a thermoplastic polymer powder 115 having an average particle size from 20 μm to 100 μm. In the example shown, the powder bed has a moveable floor 120 that allows the powder bed to be lowered after each layer of the 3-dimensional part is printed. The 3-dimensional part can include a conductive portion 125 and an insulating portion 127. The system also includes a fluid jet printer 130 that includes a first printing slot 135 in communication with a reservoir of a conductive fusing agent composition 140. The first printing slot can be configured to print the conductive fusing agent composition onto the powder bed. A second printing slot 145 is in communication with a reservoir of a nonconductive fusing agent composition 150. The second printing slot can be configured to print the nonconductive fusing agent composition onto the powder bed. After the fusing agent compositions have been printed onto the powder bed, a fusing lamp 160 can be used to expose the powder bed to electromagnetic radiation sufficient to fuse the powder that has been printed with the fusing agent compositions.

The material set used in the 3-dimensional printing system can include any of the components and ingredients described above. In a particular example, the conductive fusing agent composition can include elemental transition metal particles that are silver particles, copper particles, gold particles, or combinations thereof. In a further example, the elemental transition metal particles can have an average particle size from 10 nm to 200 nm. In another example, the transition metal oxide bronze particles in the nonconductive fusing agent composition can include a tungsten bronze, a molybdenum bronze, or combinations thereof. In certain examples, the transition metal oxide bronze particles can include a cesium tungsten bronze with the composition $Cs_xWO_3$ where $0<x<1$.

In some examples, the 3-dimensional printing system can also include a third printing slot in communication with a reservoir of a pretreat agent composition to print the pretreat agent composition onto the powder bed. The pretreat agent composition can include an aqueous solution of a metal halide salt as described above. In further examples, the 3-dimensional printing system can include additional printing slots for colored inks as described above.

To achieve good selectivity between the fused and unfused portions of the powder bed, the fusing agent compositions can absorb enough energy to boost the temperature of the thermoplastic polymer powder above the melting or softening point of the polymer, while unprinted portions of the powder bed remain below the melting or softening point. In some examples, the 3-dimensional printing system can include preheaters for preheating the thermoplastic polymer powder to a temperature near the melting or softening point. In one example, the system can include a print bed heater to heat the print bed during printing. The preheat temperature used can depend on the type of thermoplastic polymer used. In some examples, the print bed heater can heat the print bed to a temperature from 130° C. to 160° C. The system can also include a supply bed, where polymer particles are stored before being spread in a layer onto the print bed. The supply bed can have a supply bed heater. In some examples, the supply bed heater can heat the supply bed to a temperature from 90° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with fusing agent compositions leaving the unprinted portions of the polymer powder below the melting or softening point.

In one example, the fusing lamp can be matched with the energy absorbers in the fusing agent compositions so that the fusing lamp emits wavelengths of light that match the peak absorption wavelengths of the energy absorbers. An energy absorber with a narrow peak at a particular near-infrared wavelength can be used with a fusing lamp that emits a narrow range of wavelengths at approximately the peak wavelength of the energy absorber. Similarly, an energy absorber that absorbs a broad range of near-infrared wavelengths can be used with a fusing lamp that emits a broad range of wavelengths. Matching the energy absorber and the fusing lamp in this way can increase the efficiency of coalescing the polymer particles with the energy absorber printed thereon, while the unprinted polymer particles do not absorb as much light and remain at a lower temperature.

Depending on the amount of energy absorber present in the polymer powder, the absorbance of the energy absorber, the preheat temperature, and the melting or softening point of the polymer, an appropriate amount of irradiation can be supplied from the fusing lamp. In some examples, the fusing lamp can irradiate each layer from about 0.5 to about 10 seconds per pass.

Other methods of fusing the layers of polymer powder can include using microwave radiation sources, xenon pulse lamps, IR lasers, and other sources of electromagnetic radiation.

The present technology also extends to 3-dimensional printed parts formed from the materials described herein. In one example, a 3-dimensional printed part can include a conductive composite portion including a matrix of fused thermoplastic polymer particles interlocked with a matrix of sintered elemental transition metal particles, and an insulating portion including a matrix of fused thermoplastic polymer particles that is continuous with the matrix of fused thermoplastic polymer particles in the conductive composite portion. The insulating portion can be substantially free of sintered elemental transition metal particles and can include transition metal oxide bronze particles.

Figure 2:
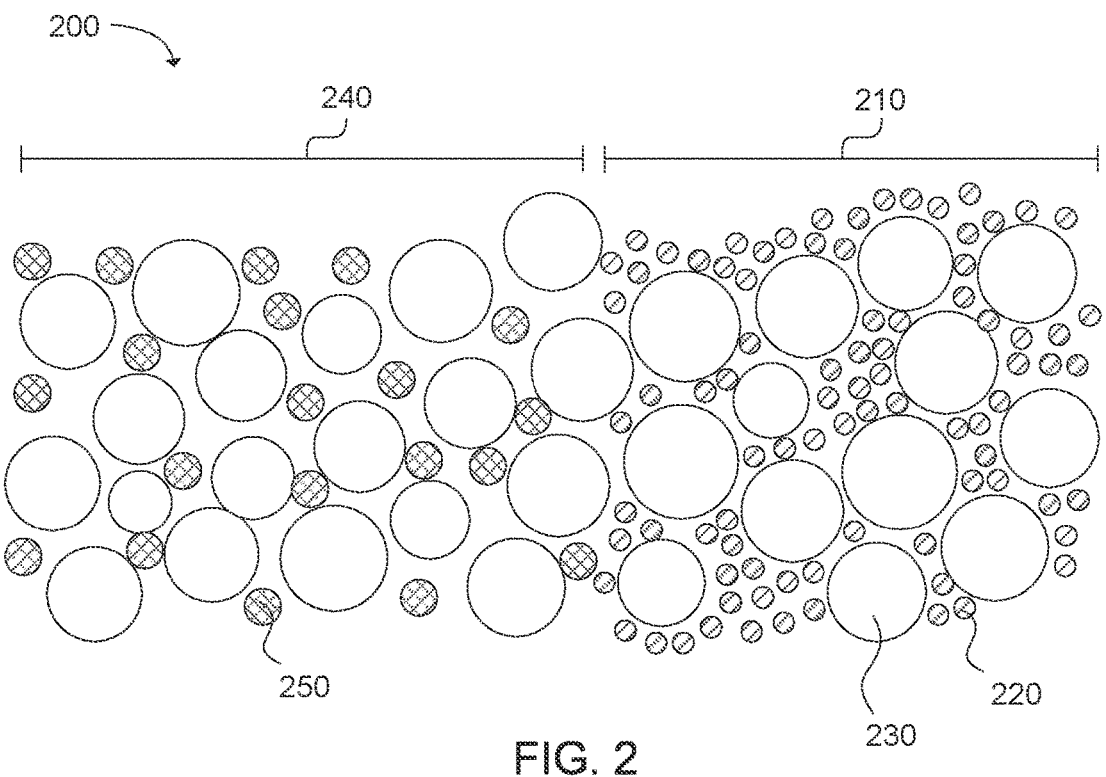
FIG. 2 is a close-up side cross-sectional view of a layer of thermoplastic polymer powder with a conductive fusing agent composition printed on a portion of the layer in accordance with examples of the present disclosure.
Figure 3:
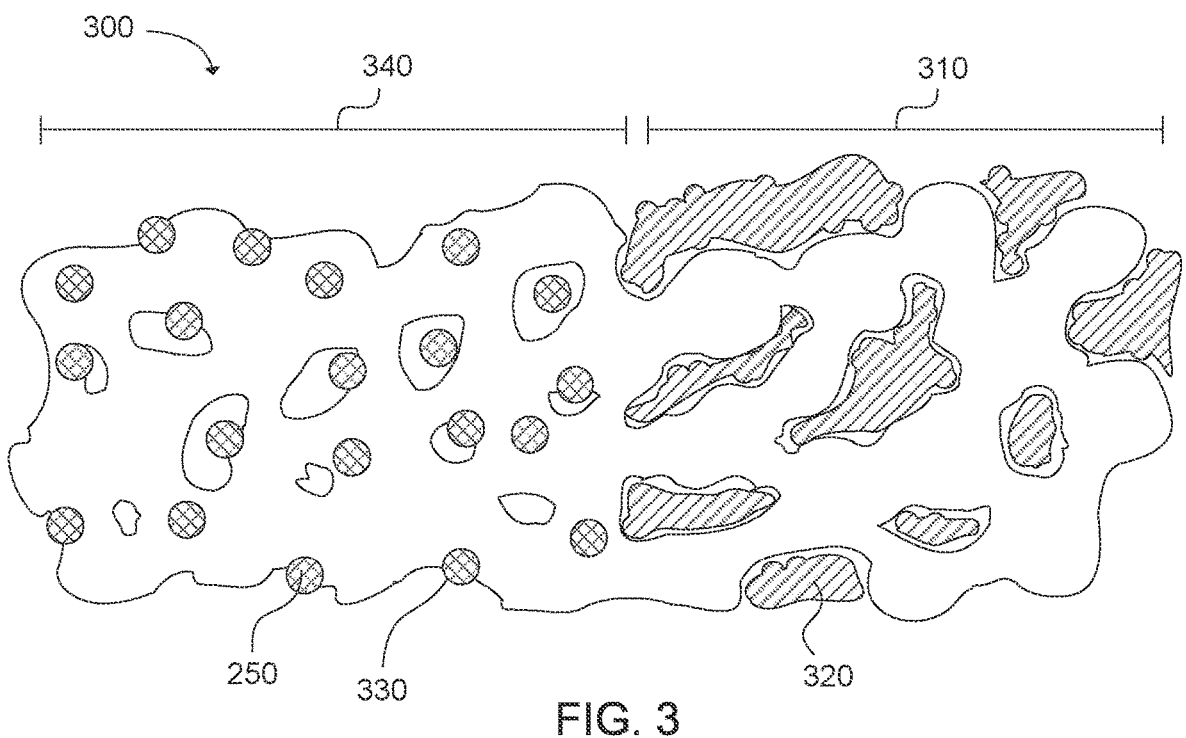
FIG. 3 is a close-up side cross-sectional view of the layer of FIG. 2 after the layer has been cured in accordance with examples of the present disclosure.

The formation of the conductive composite described above is illustrated in FIGS. 2-3. FIGS. 2-3 are close-up cross sectional views of a layer of the thermoplastic polymer powder bed that has been printed with a conductive fusing agent composition and a nonconductive fusing agent composition. FIG. 2 shows the powder layer 200 after being printed but before being cured, and FIG. 3 shows the coalesced powder layer 300 after being cured. In FIG. 2, a first portion 210 of the powder layer 200 has been printed with a conductive fusing agent composition containing transition metal particles 220. The transition metal particles penetrate into the spaces between the powder particles 230. A second portion 240 of the powder layer has been printed with a nonconductive fusing agent composition including transition metal oxide bronze particles 250. It should be noted that these figures are not necessarily drawn to scale, and the relative sizes of powder particles and transition metal particles can differ from those shown. For example, in many cases the transition metal particles can be much smaller than the powder particles, such as 2-3 orders of magnitude smaller.

When the powder layer 200 is cured by exposure to electromagnetic radiation, the transition metal particles in the first portion 310 sinter together to form a matrix of sintered metal particles 320 as shown in FIG. 3. The thermoplastic polymer particles 230 fuse together in the second portion 340, forming a matrix of fused thermoplastic polymer particles 330. The transition metal oxide bronze particles 250 become embedded in the fused polymer in the second portion. The matrix of sintered metal particles and the matrix of fused thermoplastic polymer particles are interlocked, forming the conductive composite. It should be noted that FIG. 3 shows only a 2-dimensional cross-section of the conductive composite. Although the sintered metal particles appear to be in isolated locations in the figure, the matrix of sintered metal particles can be a continuously connected matrix in three dimensions. Thus, the conductive composite can have good electrical conductivity through the matrix of sintered transition metal particles.

In some examples, the conductive composite can have sufficient electrical conductivity to be used to form electrical components. The resistance of the conductive composite can be tuned in a variety of ways. For example, the resistance can be affected by the type of transition metal in the conductive fusing agent composition, the concentration of the transition metal in the conductive fusing agent composition, the amount of conductive fusing agent composition dispensed onto the powder bed, the cross section and length of the conductive portion of the 3-dimensional printed part, and so on. When the conductive fusing agent composition is dispensed by fluid jetting, the amount of conductive fusing agent composition dispensed can be adjusted by changing print speed, drop weight, number of slots from which the fusing agent composition is fired in the fluid jet printer, and number of passes printed per powder layer. In certain examples, a conductive composite element can have a resistance from 1 ohm to 5 Mega ohms. In one example, the resistance can be measured in the conductive composite element over a distance of 1 mm to 1 cm.

Sufficient conductivity can be achieved by dispensing a sufficient amount of the transition metal onto the powder bed. In some examples, a sufficient mass of the transition metal per volume of the conductive composite can be used to achieve conductivity. For example, the mass of transition metal per volume of conductive composite can be greater than 1 mg/cm$^3$, greater than 10 mg/cm$^3$, greater than 50 mg/cm$^3$, or greater than 100 mg/cm$^3$. In a particular example, the mass of transition metal per volume of the conductive composite can be greater than 140 mg/cm$^3$. In further examples, the mass of transition metal per volume of conductive composite can be from 1 mg/cm$^3$ to 1000 mg/cm$^3$, from 10 mg/cm$^3$ to 1000 mg/cm$^3$, from 50 mg/cm$^3$ to 500 mg/cm$^3$, or from 100 mg/cm$^3$ to 500 mg/cm$^3$.

In certain examples, a smaller amount of transition metal can be dispensed to achieve surface conductivity, and a larger amount of transition metal can be applied to achieve bulk conductivity in the conductive composite. Thus, electrical traces can be printed with a smaller amount of transition metal and electrical vias can be printed with a larger amount of transition metal. As used herein, "trace" refers to an electrically conductive element which conducts electricity along an x-y plane in the 3-dimensional printed part. The x-y plane refers to the plane that contains each layer of the powder bed as the layers are printed. Thus, traces can be oriented along one of the layers that make up the final 3-dimensional printed part. In various examples, traces can be on a surface of the final 3-dimensional printed part or embedded within the part. In some examples, traces can be formed with a mass of transition metal per volume of conductive composite that is greater than 1 mg/cm$^3$ or greater than 10 mg/cm$^3$. In further examples, traces can be formed with a mass of transition metal per volume of conductive composite from 1 mg/cm$^3$ to 1000 mg/cm$^3$, 10 mg/cm$^3$ to 500 mg/cm$^3$, or 30 mg/cm$^3$ to 200 mg/cm$^3$.

As used herein, "via" refers to an electrical element that conducts electricity in the z-axis direction. The z-axis refers to the axis orthogonal to the x-y plane. For example, in 3-dimensional printing systems having a powder bed floor that lowers after each layer is printed, the z-axis is the direction in which the floor is lowered. Vias can be formed vertically so that that they conduct electricity in only the z-axis direction. Alternatively, vias can be formed in a diagonal direction that includes components of the z-axis direction and the x- and/or y-axis directions. In some examples, vias can be formed with a mass of transition metal per volume of conductive composite that is greater than 50 mg/cm$^3$ or greater than 100 mg/cm$^3$. In further examples, vias can be formed with a mass of transition metal per volume of conductive composite from 50 mg/cm$^3$ to 1000 mg/cm$^3$, 100 mg/cm$^3$ to 1000 mg/cm$^3$, or 140 mg/cm$^3$ to 500 mg/cm$^3$.

In some examples, the amount of transition metal dispensed onto the powder bed can be adjusted by printing the conductive fusing agent composition in multiple passes. In one example, a single pass of a fluid jet printhead can be sufficient to dispense enough transition metal to achieve surface conductivity. However, in some cases, a single pass is not sufficient to achieve conductivity in the z-axis direction. Additional passes can be applied to increase the amount of transition metal in the transition metal composite. A sufficient number of passes can be used to achieve conductivity in the z-axis direction. In one example, three or more passes can be used to form a conductive composite with conductivity in the z-axis direction. In further examples, the amount of transition metal dispensed can be adjusted by adjusting the drop weight of the fluid jet printhead either through resistor design or by changing firing parameters. Thus, with a greater drop weight, a greater amount of the conductive fusing agent composition can be printed with each drop fired. However, in some cases jetting too large an amount of fusing agent composition in a single pass can lead to lower print quality because of spreading. Therefore, in some examples multiple passes can be used to print more of the conductive fusing agent composition with better print quality.

In a particular example, a 3-dimensional printed part can be formed as follows. A fluid jet printer can be used to print a first pass including printing a conductive fusing agent composition onto a first portion of the powder bed and printing a nonconductive fusing agent composition onto a second portion of the powder bed. A curing pass can then be performed by passing a fusing lamp over the powder bed to fuse the polymer particles and sinter transition metal particles in the conductive fusing agent composition. Then, one or more additional passes can be performed of printing the conductive fusing agent composition onto the first portion of the powder bed to increase the amount of transition metal. Each pass of printing the conductive fusing agent composition can be followed by a curing pass with the fusing lamp. Alternatively, a number of passes printing the conductive fusing agent composition onto the powder bed can be performed without fusing the bed between passes. This can allow the conductive fusing agent composition to penetrate more fully into the powder bed before the polymer powder is fused. For example, several passes can be performed with the conductive fusing agent composition and then the fusing lamp can be used to fuse the layer. The number of passes used can depend on the desired conductivity, the contone level of the printing passes (referring to the density of fusing agent composition per area deposited on each pass), the type of transition metal in the conductive fusing agent composition, concentration of transition metal in the conductive fusing agent composition, thickness of the layer of polymer powder being printed, and so on.

Figure 4:
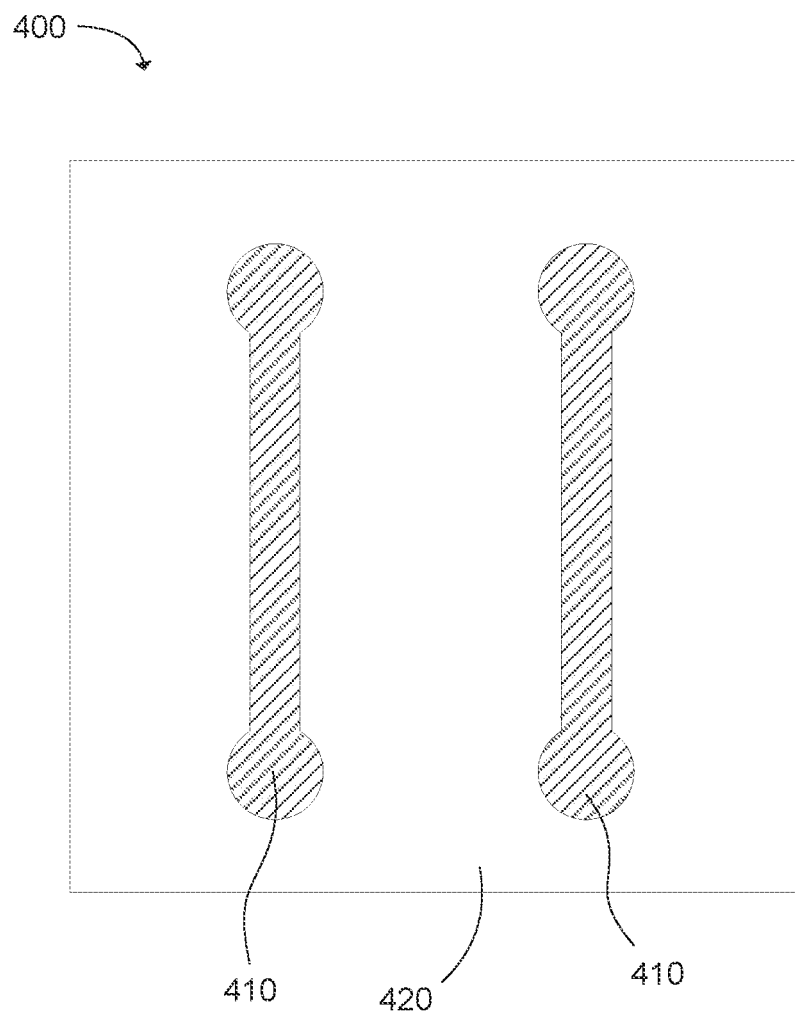
FIG. 4 is a top plan view of a 3-dimensional printed part having two electrically conductive traces in accordance with examples of the present disclosure.

FIG. 4 shows an example of a 3-dimensional printed part 400 including two electrically conductive traces 410. The portions of the printed part making up the traces are a conductive composite made by fusing polymer powder with a conductive fusing agent composition. The remaining portions of the printed part are insulating portions 420. The insulating portions are made by fusing polymer powder with transition metal oxide bronze particles.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which additives are placed to form jettable fluids, such as inks. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and energy absorbers, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 5 wt %.

As used herein, "fluid jetting," "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

A 3-dimensional printing system was used to print a part including multiple electrically conductive traces separated by insulating portions. A conductive fusing agent composition, pretreat agent composition, and nonconductive fusing agent composition were printed from three separate printing slots. The conductive fusing agent composition was a silver ink (Mitsubishi NBSIJ-MU01) containing silver nanoparticles. The silver nanoparticles had an average particle size of approximately 20 nm. The pretreat agent composition was a solution of 3 wt % sodium chloride in water. The nonconductive fusing agent composition included cesium tungsten bronze particles in an aqueous vehicle. The cesium tungsten bronze was a non-stoichiometric substance with the approximate formula $Cs_{0.33}WO_3$. An additional fusing agent composition including carbon black was also tested for comparison.

The tungsten bronze fusing agent composition had the following formulation: 10.4 wt % 1-(-2-hydroxyethyl)-2-pyrrolidone (HE-2P); 44.44 wt % of an aqueous dispersion having 18 wt % of 5 nm tungsten bronze particles in the dispersion; 0.62 wt % Tergitol™ 15-S-7 surfactant (available from DOW Chemical Company); and 44.53 wt % water.

The fusing agent compositions and pretreat agent composition were jetted onto a bed of nylon (PA12) particles (Vestosint®×1556). The nylon particles had an average particle size of approximately 50 μm. The layer thickness was approximately 100 μm. Each layer was printed with the pretreat agent composition followed by the silver ink in the conductive portions, and the tungsten bronze fusing agent composition or the carbon black fusing agent composition in the insulating portions. The fluids were printed at contone levels of 255 for the silver ink, 255 for the pretreat agent composition, and 80 for the tungsten bronze fusing agent composition and carbon black fusing agent composition. A single pass of silver ink was printed per layer. Using these settings, the amount of solid silver dispensed onto the powder was 47 mg/cm$^3$ of the powder layer and the amount of chloride salt dispensed was 7.7 mg/cm$^3$ of the powder layer.

The printer powder supply and powder bed were filled with the nylon particles. The supply temperature was set at 110° C. and the print bed temperature was set at 130° C. A heater under the print bed was set at 150° C. The print speed was set at 10 inches per second (ips) and the cure speed was set at 7 ips. Curing was performed using two 300 W bulbs placed approximately 1 cm away from the surface of the powder bed.

The resistances of the insulating portions of each printed part were measured by placing digital multimeter contacts at locations approximately 1 cm apart on the surface of the insulating portions. The insulating portion formed using the tungsten bronze fusing agent composition registered as open, e.g., no measurable electrical connection between the multimeter contacts was found. The part formed using the carbon black fusing agent composition measured a resistance of 19.06 MΩ. Although this is a rather high resistance, the electrical conductivity of the carbon black can potentially cause cross talk between the electrically conductive traces.

Example 2

A nonconductive fusing agent composition is prepared from the following ingredients: 14 wt % 1-(2-hydroxyethyl)-2-pyrrolidone (HE-2P); 4 wt % Silquest® A-1230 dispersing agent (available from Momentive Performance Materials); 44.44 wt % of an aqueous dispersion having 18 wt % of 5 nm tungsten bronze particles in the dispersion; 0.62 wt % Tergitol™ 15-S-7 surfactant (available from DOW Chemical Company); and 36.93 wt % water. The nonconductive fusing agent composition is used in a 3-dimensional printing system as described in Example 1.

Example 3

A nonconductive fusing agent composition is prepared from the following ingredients: 12 wt % 2-pyrrolidone; 0.80 wt % Surfynol® 465 surfactant (available from Air Products); 8 wt % betaine monohydrate; 44.44 wt % of an aqueous dispersion having 18 wt % of 5 nm tungsten bronze particles in the dispersion; and 34.76 wt % water. The nonconductive fusing agent composition is used in a 3-dimensional printing system as described in Example 1.

Example 4

A nonconductive fusing agent composition is prepared from the following ingredients: 12 wt % 2-pyrrolidone; 0.80 wt % Surfynol® 465 surfactant (available from Air Products); 8 wt % beta-alanine; 44.44 of an aqueous dispersion having 18 wt % of 5 nm tungsten bronze particles in the dispersion; and 34.76 wt % water. The nonconductive fusing agent composition is used in a 3-dimensional printing system as described in Example 1.

What is claimed is:

1. A 3-dimensional printed part, comprising:
   two conductive composite portions, each of which comprises a matrix of fused thermoplastic polymer particles interlocked with a matrix of sintered elemental transition metal particles; and
   an insulating portion positioned between the two conductive composite portions, the insulating portion comprising a matrix of fused thermoplastic polymer particles that is continuous with the matrix of fused thermoplastic polymer particles in the conductive composite portions, wherein the insulating portion is substantially free of the sintered elemental transition metal particles, and wherein the insulating portion comprises transition metal oxide bronze particles.

2. The 3-dimensional printed part of claim 1, wherein the sintered elemental transition metal particles comprise silver particles, copper particles, gold particles, or combinations thereof.

3. The 3-dimensional printed part of claim 1, wherein the sintered elemental transition metal particles are generated from elemental transition metal particles having an average particle size from 10 nm-200 nm.

4. The 3-dimensional printed part of claim 1, wherein the transition metal oxide bronze particles comprise a tungsten bronze, a molybdenum bronze, or combinations thereof.

5. The 3-dimensional printed part of claim 1, wherein the transition metal oxide bronze particles comprise a cesium tungsten bronze with a composition $Cs_xWO_3$ ($0<x<1$) having an average particle size of 2 nm-200 nm.

6. The 3-dimensional printed part of claim 1, wherein the two conductive composite portions further include conductive fusing agent composition components introduced to the thermoplastic polymer particles with elemental transition metal particles to form the sintered elemental transition metal particles.

7. The 3-dimensional printed part of claim 1, wherein the insulating portion further includes nonconductive fusing agent composition components introduced to the thermoplastic polymer particles with the transition metal oxide bronze particles.

8. A 3-dimensional printed part, comprising:
   a conductive composite portion comprising a matrix of fused thermoplastic polymer particles interlocked with a matrix of sintered elemental transition metal particles; and
   an insulating portion comprising a matrix of fused thermoplastic polymer particles that is continuous with the matrix of fused thermoplastic polymer particles in the conductive composite portion, wherein the insulating portion is substantially free of sintered elemental transition metal particles, wherein the insulating portion comprises transition metal oxide bronze particles, and wherein the insulating portion substantially prevents crosstalk between two of the conductive composite portions.

9. The 3-dimensional printed part of claim 1, wherein the two conductive composite portions and the insulating portion are thermally fused.

* * * * *